Aug. 7, 1962 R. E. CROSS 3,048,059
INDEX TABLE FOR MACHINE TOOLS
Filed Jan. 11, 1960 5 Sheets-Sheet 1
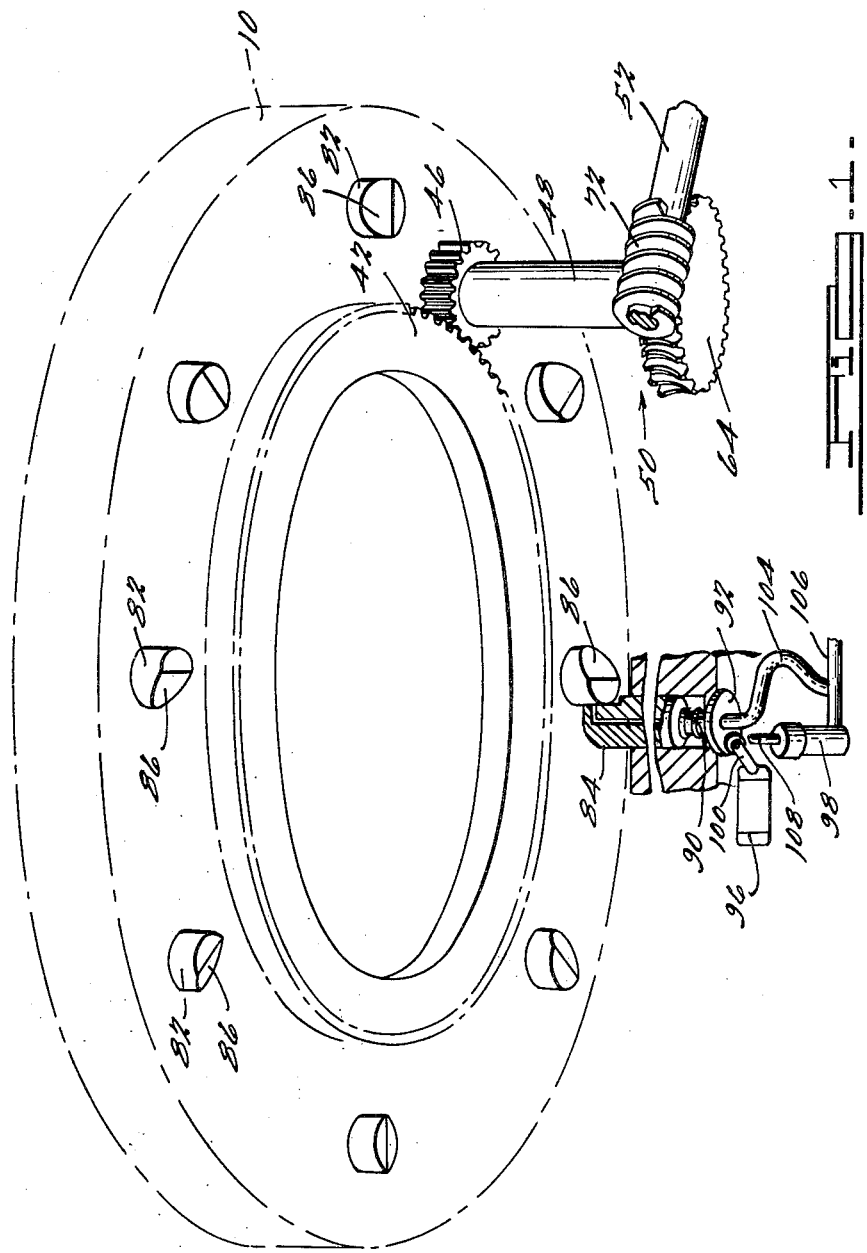
INVENTOR.
Ralph E. Cross.
BY
Harness, Dickey & Pierce.
ATTORNEYS.

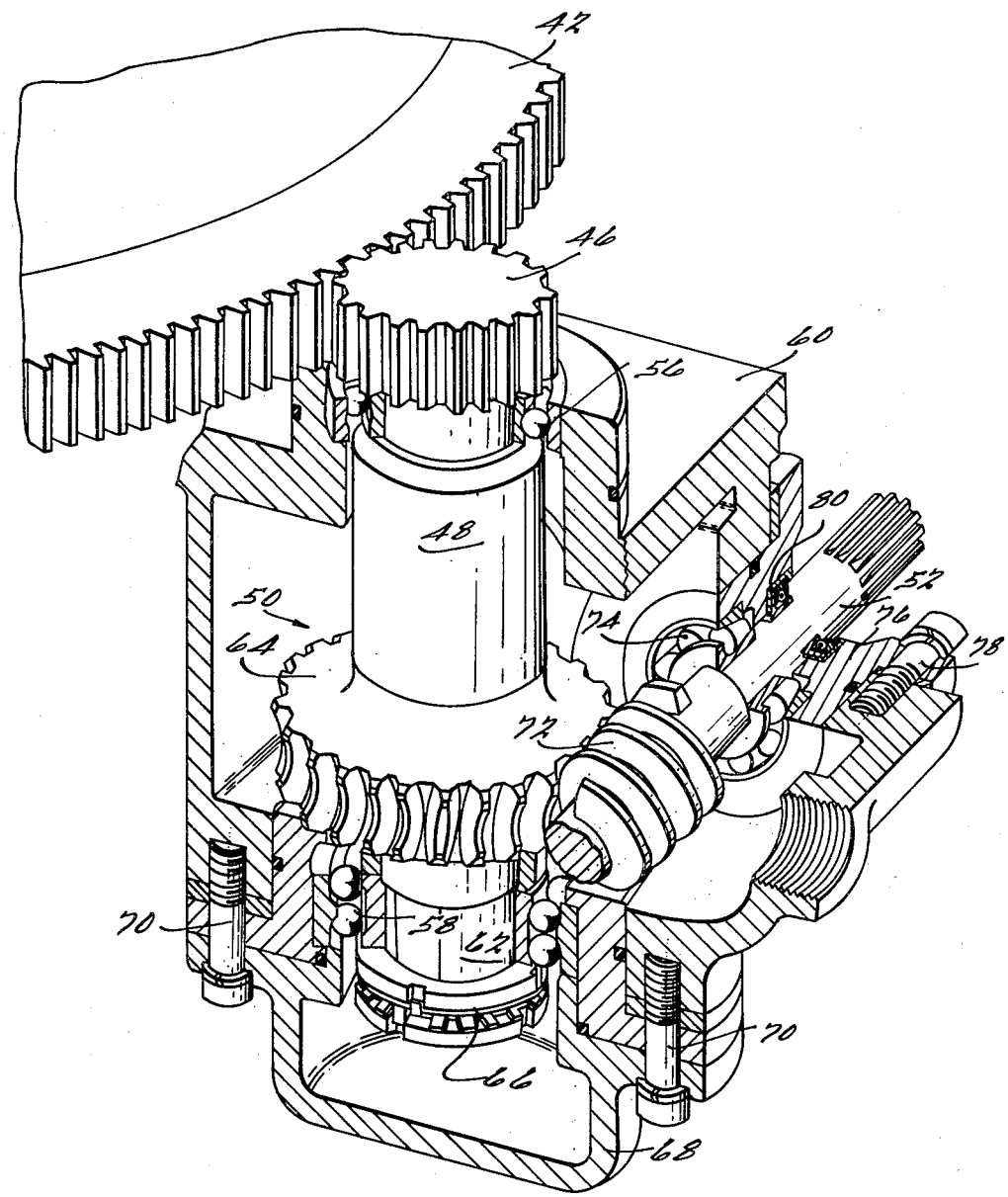

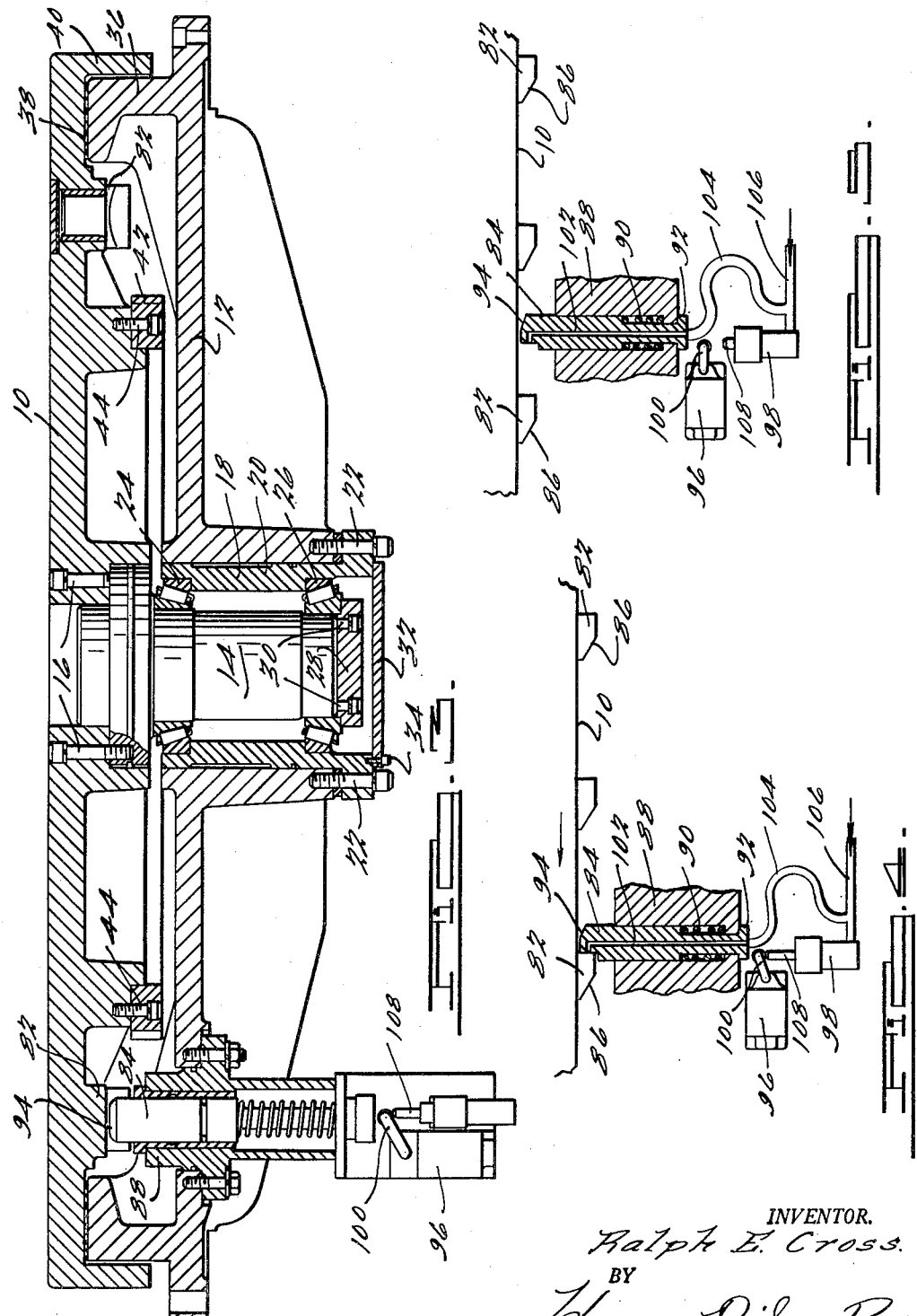

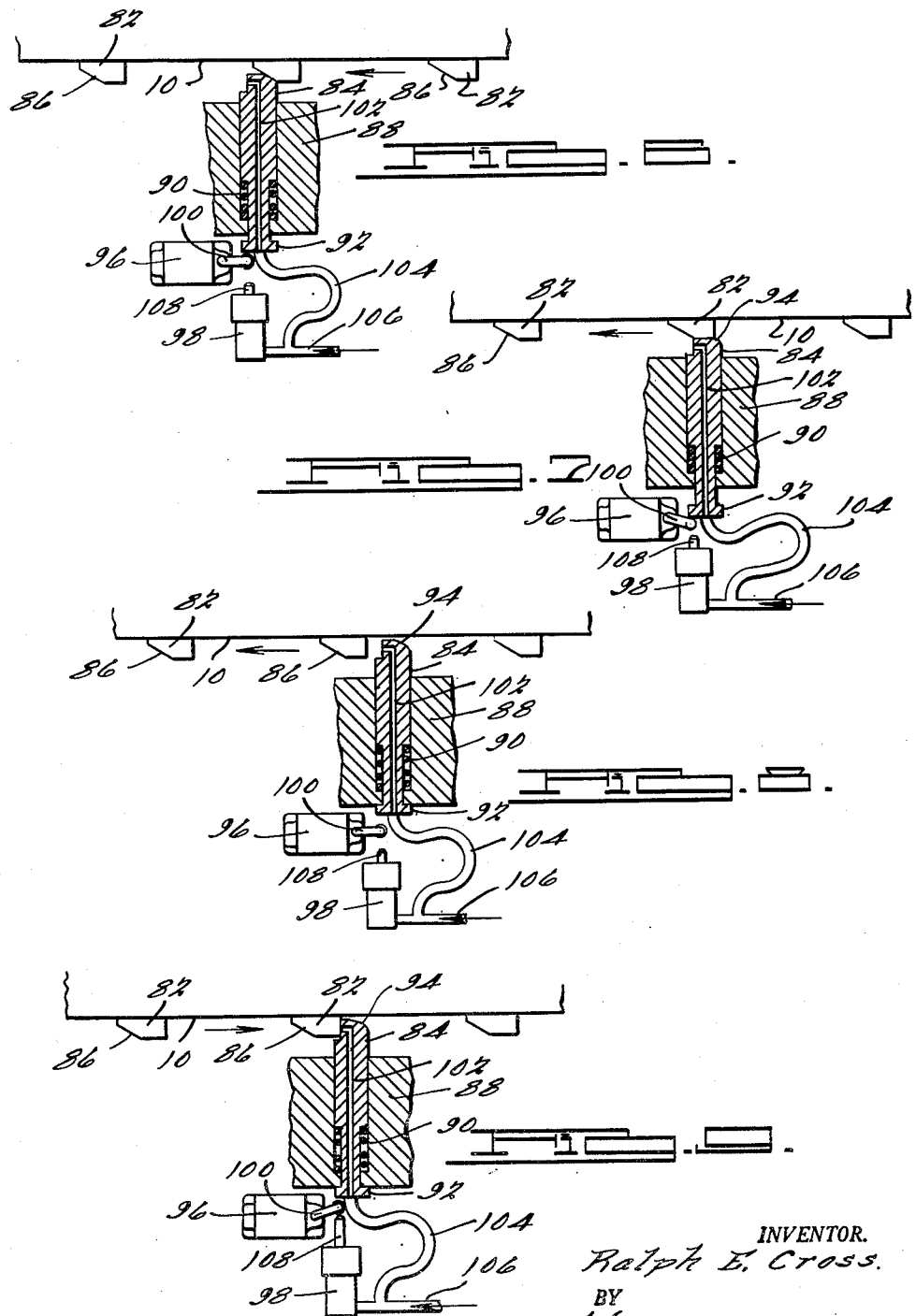

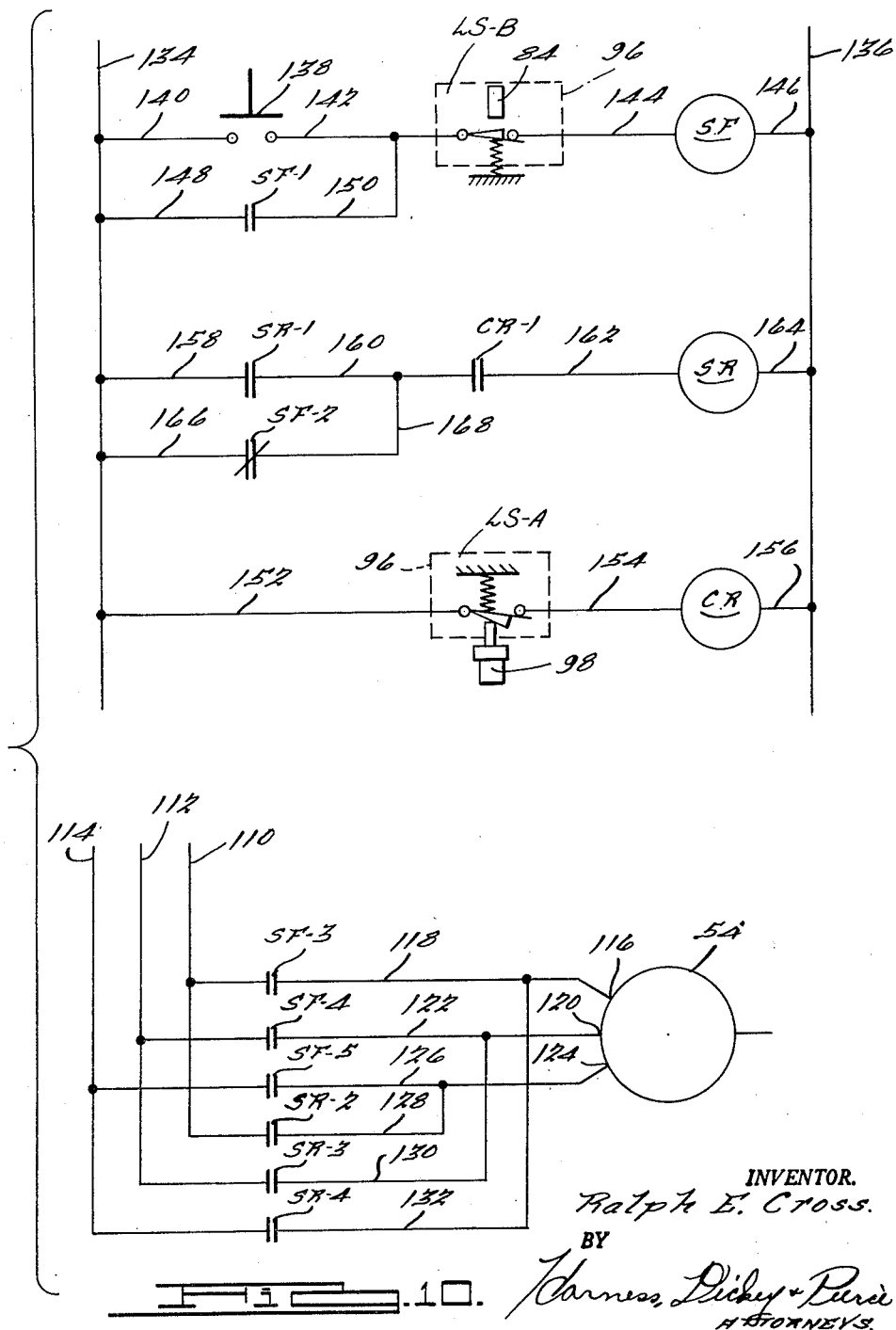

United States Patent Office 3,048,059
Patented Aug. 7, 1962

3,048,059
INDEX TABLE FOR MACHINE TOOLS
Ralph E. Cross, Grosse Pointe Shores, Mich., assignor to The Cross Company, Fraser, Mich., a corporation of Michigan
Filed Jan. 11, 1960, Ser. No. 1,613
9 Claims. (Cl. 74—819)

This invention relates to new and useful improvements in indexing mechanisms and more particularly to an indexing that is primarily adapted and pre-eminently suited for machine tools.

In multiple station machine tools, it is necessary to move a work piece or work pieces progressively through work stations and to locate each work piece precisely in its work station with respect to tools which act on the work. In a rotary or turret type machine, the work is conventionally located in the stations by disconnecting the table drive after each indexing operation. The table is disconnected from the drive sometime before it reaches the indexed position and is permitted to coast the final distance. The drive (hydraulic or electrical) conventionally is controlled by a limit switch operated by a dog on the table, and in order to assure operation of the switch it must be located a substantial distance ahead of the stop. Also it is conventional practice to initiate subsequent operations of the machine tool by an interlock limit switch which also is operated by a dog on the table, and this switch also must be located well ahead of the stop in order to assure full operation of the switch arm. Proper timing of the operations controlled by the limit switches requires that they be located precisely with respect to the stop, and considerable trouble is caused by the switches or the operating dogs getting out of adjustment.

An important object of this invention is to provide an index control mechanism primarily adapted and pre-eminently suited for machine tools that eliminates the need for precise setting and close adjustment of the disconnect and interlock switches and the troubles and difficulties attending such need.

Another object of the invention is to provide an index control mechanism that operates positively at the end of each index cycle to signal when the table is properly locked in position and that utilizes the signal to initiate subsequent operations of the machine tool.

A particular problem arises in machines that index unevenly or in different increment of index motion. A typical example is a machine having an indexable turntable adapted to carry a single work piece in which holes or other machining operations are to be formed in the work piece at different angularly or circumferentially spaced points. In this situation, the table and the work piece is turned or indexed different angular amounts in accordance with the spacing between the different operations to be performed on the work. It is difficult and in many instances impossible to set up a conventional machine to perform an operation of the above type and a particular object of this invention is to provide an index control mechanism that will operate to index the table unevenly and in accordance with the exigencies of the particular situation.

Other objects and advantages of the invention will be apparent during the course of the following description.

In the drawings, forming a part of this specification and wherein like numerals are employed to designate like parts throughout the same, I have shown the invention embodied in a turret type machine tool having rotatable table on which work pieces are mounted and progressively indexed from station to station in the usual way. An electric motor drive is shown for the table. It will be readily appreciated, however, that the invention is not necessarily limited to a machine tool having a rotatable table nor is it limited to a motor drive for the transfer device. Persons skilled in the art can readily adapt the invention to straight line transfer mechanisms and to some other type of power drive means such as a fluid motor drive, a pawl and ratchet drive or a Geneva cam drive.

Reference is now had to the drawings, wherein:

FIG. 1 is a schematic mechanical view showing a rotatable work carrying table, a rotary drive for the table and a control means for locating and positioning the table after each index operation;

FIG. 2 is a fragmentary perspective view showing details of the table drive mechanism;

FIG. 3 is a vertical diametrical sectional view through the table showing a rotary mounting suitable therefor and illustrating the relationship between the table and the index control mechanism;

FIGS. 4–9 are schematic views progressively illustrating the position of the table and of the control means during an index cycle of the machine; and FIG. 10 is a wiring diagram of the control circuit.

Inasmuch as the turret machine here shown is a conventional type, only that portion of the machine required to show the index control mechanism of this invention and to illustrate the relationship between the control mechanism and the machine is given. In accordance with the foregoing, reference is first had to FIG. 3 which shows the table 10 of the machine mounted for rotation on and supported by a base casting 12. In this connection, it will be observed that a central journal 14 fastened to the underside of the table 10 by screws 16 extends downwardly through a collar 18 which is mounted in a central opening 20 provided in the base 12. Screws 22 fasten the collar 18 to the base 12, and tapered roller bearings 24 and 26 support the journal 14 for rotation in the collar 18. The lower bearing 26 is confined by a retainer plate 28 which is fastened to the lower end of the journal 14 by screws 30. A closure plate 32 is fastened to the lower end of the collar 18 by screws 34. Manifestly, the table 10 rotates with the journal 14 and relative to the base 12. The outer marginal portion of the table 10 is supported by an upstanding annular flange 36 on the base 12 and if desired a suitable bearing such as the "Teflon" rim bearing 38 may be interposed between the flange 36 and the table to provide an anti-friction support for the latter. A depending peripheral flange 40 on the table 10 surrounds and is spaced from the flange 36 to prevent dirt chips and the like from gaining access to the rim bearing 38. The base 12 preferably is at least partially filled with a suitable lubricating oil to a level above the top bearing 24.

In practice, base 12 is mounted on a suitable supporting structure (now shown) and in the form of the invention here shown the table 10 is provided with suitable means (not shown) for mounting and holding work pieces thereon. It will be readily appreciated in this connection that the table 10 is adapted to rotate the work pieces through a series of stations in the machine and the machine shown is adapted to carry as many work pieces as there are stations. The particular machine here shown by way of illustration has eight stations and the table therefore would be equipped with work holding means disposed to fix eight work pieces in equispaced relation on the table. One station usually is a loading and unloading station wherein a finished workpiece is removed from the table and replaced by an unfinished work piece. The other stations may be work stations in which work is performed on the work pieces or they may be a combination of work and idle stations depending on the exigencies of the particular situation. The work holding fixtures for holding the work pieces located on and attached to the table vary depending on the size and shape of the particular work piece to be clamped. The machines in the various work stations of course vary depending upon the particular operations to be performed on the work pieces. These machines and devices, however, are conventional in the trade and therefore are not shown herein.

A rotary drive is provided for the table 10 to index the work pieces progressively from station to station. It is contemplated that any suitable or conventional type of drive can be used for this purpose. A pawl and ratchet drive, a Geneva or cam drive, a fluid motor drive or an electric motor drive are typical examples of suitable drive mechanisms. As suggested, an electric motor drive is here shown by way of illustration.

As perhaps best shown in FIG. 1, a bull gear 42 is fastened concentrically to the underside of the table 10 by screws 44. The gear 42 is engaged by a drive gear 46 carried by a vertical shaft 48, and the latter is connected by a worm and gear set 50 to a horizontal shaft 52 which is connected to the drive shaft of a reversible motor 54 (FIG. 10) either directly or through conventional gear reduction unit (not shown).

Reference is now had to FIG. 2 which shows the mechanical details of the drive mechanism. As shown, the vertical shaft 48 is supported for rotation by upper and lower bearings 56 and 58 mounted in a housing 60 which conveniently may be a part of or attached to the base 12. In the particular mechanism here shown, the shaft 48 extends below the worm gear 64 of the set 50 and the lower portion 62 of the shaft is held securely but rotatably by the bearing 58 and lock nuts 66. The housing 60 preferably is formed with a removable lower portion 68 which normally is retained by the screws 70. When the lower portion 68 is removed, it provides access to lock nuts 66 and the bearing 58. The worm portion 72 of the set 50 is shown as an integral part of the horizontal shaft 52 which extends through a bearing 74 and bearing retainers 76 in the housing 60. A bearing (not shown) similar to the one shown at 74 is provided for the shaft 52 ahead of the worm 72. Screws 78 hold the retainer 76 attached to the housing 60, and the seal 80 set into the retainer 76 around the shaft 52 prevents leakage of lubricant or the like from the housing around the shaft.

Manifestly, the rotary drive mechanism hereinabove described will rotate the table 10 to move work pieces thereon progressively and in succession through the various stations of the machine. However, it is necessary also to include means for stopping the table 10 intermittently with the work pieces precisely positioned for engagement by cutting tools or the like in the stations.

To this end, the table 10 is provided with a plurality of index stops 82, one for each station of the machine. Thus, eight such stops 82 are shown in the particular machine here under consideration. Each stop 82 is in the form of an embossment or pin on the underside of the table 10 and extending downwardly therefrom. All of the index stops 82 extend a uniform distance below the table 10, and in the arrangement shown they are equispaced accurately around the table. As the table 10 rotates, the index stops 82 successively strike a detent in the form of a locating pin 84 and in each instance the table is brought to rest with the engaging stop against the locating pin, as shown in FIG. 1. Thus, each index stop 82 must be accurately positioned on the table 10 and particularly with reference to its respective work locating and clamping means so that when the table is stopped with any index stop against the locating pin the work pieces are sufficiently accurately positioned with respect to tools in the stations of the machine that work performed thereon is within permissible tolerance limits.

The table 10 is adapted to rotate in the direction indicated by the arrow in FIG. 1, and the leading side of each index stop 82 is formed with a beveled cam face 86. The locating pin 84 is mounted for vertical sliding movement in a suitable support 88 below the table 10. If desired, the support 88 can be a part of the base 12 or it can be a separately formed part mounted on and attached to the base 12, as shown in FIG. 3. The lower portion of the locating pin 84 is reduced in diameter and a spring 90 in the annular space provided by the reduced portion of the locating pin 84 limits upward movement of the pin so as to prevent interference between the latter and the table 10. Thus, the locating pin 84 is free to move downwardly into support 88 but normally is held in a fully raised position.

The table 10 normally is positioned with one of the stops 82 against the locating pin 84. When the table 10 is rotated in the direction of the arrow in FIG. 1, the immediately following index stop 82 moves toward the locating pin 84 and when the beveled face 86 of the following stop strikes the pin, its cam actuates the latter downwardly against the action of the spring 90 sufficiently to permit the actuating stop to ride over the pin and to move beyond it. In this connection, it will be observed that the upper end of locating pin 84 is slightly beveled as at 94 to facilitate the downward camming action of the pin.

According to the present invention, the rotary drive mechanism for the table 10 is controlled by an interlock limit switch 96, and the switch is positioned to be actuated in one direction by the locating pin 84 when the latter is depressed in the manner hereinabove described and to be actuated in the opposite direction by an air cylinder 98. The control mechanism is shown graphically in FIG. 3. The limit switch 96 here shown is a conventional type having two separate sets of contacts. One set of contacts is closed by the locating pin 84 and the other set of contacts is closed by the air cylinder 98. Thus, when the locating pin 84 actuates the arm 100 of switch 96, as shown in FIG. 7, it closes one set of contacts; and when the arm 100 is actuated by the air cylinder 98, as shown in FIG. 4, it closes the other set of contacts. When the actuating arm 100 is in a neutral position, as shown in FIG. 5, both sets of contacts are open. It will be readily appreciated in this connection that two separate limit switches can be used, one operated by the locating pin 84 and the other operated by the air cylinder 98. However, the basic function and mode of operation would be the same as in the particular arrangements here shown. Also, some variations in the particular control device may be necessary in adapting the apparatus of this invention in different conventional drives for the table 10, but these modifications are obvious ones well within the skill of an ordinary mechanic in this particular art.

In the apparatus here shown, the limit switch 96 is electrically connected to the motor 54 and the control apparatus is such that the motor is rotatably driven to advance the table 10 when a cycle start switch, for example, is manually actuated. The table 10 turns to index the work pieces thereon until the following index stop 82 strikes the locating pin 84. When this happens, the locating pin 84 is depressed in the manner hereinabove described to actuate the limit switch 96 and the actuating stop overrides and moves past the locating pin. Actuation of the limit switch 96 causes the motor 54 to reverse its direction of travel, and this in turn causes the table 10 to back up. After the overriding stop 82 moves past the locating pin 84, the latter, of course, is raised immediately to its original, normal position by the spring 90 where it is once again in the path of travel of the stop 82. Thus, reverse movement of the table 10 causes the overriding stop 82 to back up against the locating pin 84.

As shown in the drawing, the locating pin 84 has a longitudinal air passage 102 which opens at the upper end thereof laterally through the side of the locating pin and at the lower end thereof downwardly through the bottom of the pin. The upper end of the air passage 102 is adapted to be closed by the index stop 82 when it backs against the locating pin 84 as hereinabove described, and the lower end of the air passage 102 is connected to the air cylinder 98 by a pipe 104. Air under pressure is supplied to the pipe 104 by a supply pipe 106.

When the upper end of passage 102 is open as it is during advancement of the table 10 and at all times except when an index stop is backed thereagainst as shown in FIG. 4, air from the pipe 104 moves freely through the passage and out through the open upper end thereof so that pressure in the system and particularly in the air cylinder 98 is relatively low. However, when the upper end of the passage 102 is closed by an index stop 82, pressure in the system builds up sufficiently to operate air cylinder 98 and to cause the piston actuator 108 thereof to engage and actuate the arm 100 of limit switch 96.

In order to assure a close fit between the actuating stop 82 and the locating pin 84, the latter may be formed at the discharge orifice of the passage 102 with a transversely curved face which conforms exactly to the contour of the stop. Alternatively, the locating pin 84 can be formed with a flat face at the orifice of the passage 102 and the rear sides of the index stops 82 can be correspondingly flattened to assure proper seating of the index stops 82 against the locating pin and complete closure of the passage 102 by the particular index stop in engagement therewith.

A typical electrical circuit for the control device is shown in FIG. 10. Line current is supplied to the motor 54 by conductors 110, 112 and 114. Main line conductor 110 is connected to the motor contact 116 by conductor 118, main line conductor 112 is connected to the motor contact 120 by conductor 122, and main conductor 114 is connected to the motor contact 124 by conductor 126. In order to permit reversal of the motor 54, the main line conductor 110 is connected to motor contact 124 by conductor 128, main line conductor 112 is connected to motor contact 120 by conductor 130 and main line conductor 114 is connected to motor contact 116 by conductor 132. Flow of current through the conductors 118, 122, 126, 128, 130 and 132 is controlled by switches as hereinafter described.

Current is supplied to the control portion of the electrical circuit through main line conductors 134 and 136. In this circuit, the interlock limit switch 96 is shown in dotted outline and as having two sets of contacts LS–A and LS–B. Contacts LS–A are adapted to be closed by the air cylinder 98 and the contacts LS–B are adapted to be opened by the locating pin 84. Contacts LS–B are connected between the main line conductors 134 and 136 and in series with a manually operated, push button type cycle start switch 138 and a relay SF by conductors 140, 142, 144 and 146. The relay SF has a normally open first switch, designated SF–1, connected in bypass relation to the cycle start switch 138 by conductors 148 and 150. As suggested, the switch SF–1 is open when the relay SF is de-energized and conversely is closed when the relay SF is energized. Thus, closure of the cycle start switch 138 energizes the relay SF when the interlock relay contacts LS–B are closed, and the contacts SF–1, which are closed when the relay SF is energized, locks in the circuit through the relay and maintains the latter energized after the cycle start button is released to reopen the cycle start switch 138. The other contacts LS–A are connected between the main line conductors 134 and 136 and in series with a control relay CR by conductors 152, 154 and 156. A second relay, designated SR, is connected between the main line conductors 134 and 136 and in series with a pair of switches designated SR–1 and CR–1 by conductors 158, 160, 162 and 164. Switch SR–1 is normally open (viz., when relay SR is de-energized) and switch CR–1 is normally closed (viz., when relay CR is de-energized). A second switch, designated SF–2 of the relay SF, is connected in parallel with and in bypass relation to the switch SR–1 by conductors 166 and 168. Contacts SF–2 are closed when the relay SF is de-energized. The relay SF has three additional switches SF–3, SF–4 and SF–5 in the conductors 118, 122 and 126, respectively, which supply current to the motor 54 and these switches are open when relay SF is de-energized. Similarly, relay SR has three additional switches SR–2, SR–3 and SR–4 in conductors 128, 130 and 132, respectively. All three of the contacts SR–2, SR–3 and SR–4 are open when relay SR is de-energized and conversely are closed simultaneously when relay SR is energized.

In use, the table 10 normally is positioned after each cycle of operation as shown in FIGS. 1 and 4, for example, with one of the index stops 82 backed against the locating pin 84. As described, stop 82 closes the air passage 102 and activates the air cylinder 98 to close the contacts LS–A of limit switch 96. Thus, during the rest or dwell period of the machine when work is being performed on the work pieces, relay CR is energized and switch CR–1 is open. Since current cannot flow through the open switch CR–1, relay SR also is de-energized. The interlock contacts LS–B are closed, but relay SF is de-energized because both the cycle start switch 138 and the relay contacts SF–1 are open. Thus, all of the switches SF–3, SF–4, SF–5, SR–2, SR–3 and SR–4 controlling the motor 54 are open and the motor is shut off or de-energized. The table 10, however, is held securely in the indexed position with the index stop 82 against locating pin 84 by the worm and gear set 50 as the latter locks under power to hold the table with the stop against the locating pin.

After the machine tool has completed its cycle of operation, a new cycle is initiated by closure of the cycle start switch 138. This may be done manually as shown in the wiring diagram of FIG. 10 or it can be performed automatically by suitable mechanical or electrical means according to conventional practice. In any event, closure of the cycle start switch 138 causes current to flow through the closed contacts LS–B of the interlock limit switch 96 and through the relay SF to energize the latter. This, in turn, closes switch SF–1, opens switch SF–2 and closes switches SF–3, SF–4 and SF–5. Closure of switch SF–1 locks in the circuit through relay SF after the cycle start button is released and the switch 138 has opened. Opening of switch SF–2 is without effect as the circuit through relay SR already is broken by the open relay contacts CR–1. Closure of switches SF–3, SF–4 and SF–5 energizes the motor 54 to advance the table 10.

As soon as the table 10 begins to move forward, the index stop 82 that theretofore had been against the locating pin 84 also moves away from the locating pin and opens the air passage 102. This permits air pressure in the system to drop and permits the piston actuator 108 of the air cylinder 98 to retract, as shown in FIG. 5, releasing the switch actuator arm 100 and opening the switch contacts LS–A. The open contacts LS–A de-energize relay CR which closes relay contacts CR–1 and prepares a circuit through relay SR subject to closure of either contacts SR–1 or contacts SF–2. Switches SF–3, SF–4 and SF–5 of course are not affected so that motor 54 continues to advance the table 10.

The table 10 continues to advance until the adjacent following index stop 82 strikes the locating pin 84, as shown in FIG. 6. When this occurs, the beveled face 86 of the index stop 82 cooperates with the beveled face 94 of the locating pin 84 to depress the latter against the spring 90. Continued advancement of the table 10 causes the actuating index stop 82 to ride over the top of the locating pin 84, as shown in FIG. 7; and, as the locating pin is depressed, it operates the limit switch actuator arm 100, as shown in FIG. 7, to open the limit switch contacts LS–B. This, of course, interrupts the circuit through relay SF and opens relay contacts SF–1, closes relay contacts SF–2 and opens relay contacts SF–3, SF–4 and SF–5. Closure of contacts SF–2 completes a circuit through relay SR, and energization of relay SR closes relay contacts SR–1, SR–2, SR–3 and SR–4. Thus, all of the switches in the circuit with relay SR are closed and motor 54 is reversed. In the meantime, however, the table 10 will have coasted beyond the locating pin 84, as shown in FIG. 8. As soon as the locating pin 84 is released by the index stop 82, it is pushed upwardly by the spring 90 to its original position with the upper portion thereof in the path of travel of the index stop. Thus, when the motor 54 is reversed, it causes the table 10 to back up and bring the overriding index stop 82 back against the locating pin 84 as shown in FIG. 9, thereby closing the passage 102.

When the locating pin 84 pops up after being released by the overriding index stop 82, it releases the actuating arm 100 of limit switch 96 and closes the limit switch contacts LS–B. These contacts close, however, without effect as both the cycles start switch 138 and the contacts SF–1 are open. As soon as the overriding index stop 82 backs up against the locating pin 84 and closes the passage 102, pressure again builds up in the system sufficiently to operate the air cylinder 98. When this occurs, the air cylinder 98 operates the actuator arm 100 of limit switch 96, as shown in FIG. 9, to close the limit switch contacts LS–A. This completes a circuit through relay CR and opens its contacts CR–1. This, in turn, interrupts the circuit through relay SR and opens contacts SR–1, SR–2, SR–3 and SR–4. Motor 54 then stops and holds the table 10 in pressed engagement with the locating pin 84 to locate work pieces on the table accurately in the various stations of the machine. This completes the operating cycle of the machine.

From the foregoing, it will be readily apparent that the index and control mechanism of this invention positions the table accurately after each indexing operation by bringing one of the index stops 82 solidly against the locating pin 84. Since the position of the locating pin is fixed, it provides a positive stop which accurately locates the table 10. Also, the motor 54 winds up the drive mechanism between the motor 54 and the table 10 to take out any play or looseness in the gearing which drives the table. The use of a locking worm and gear set as part of the gearing assures a positive locking action which prevents rotary movement of the table 10 after all switches in the motor circuits have been opened and which positively holds the table securely during the dwell period when work is performed on the work pieces carried by the table. In this connection, however, it will be readily appreciated that a locking worm and gear set is necessary only when the drive means is disconnected as in the arrangement here shown. In other drive forms such as a hydraulic cylinder, for example, fluid pressure in the cylinder provides the necessary locking action to hold the stop against the locating pin. Further, the mechanism of this invention eliminates completely the necessity of operating limit switches directly by the table and thus does away with the problem of accurately calculating the coasting distance of the table. The instant mechanism does not require as accurate positioning of the interlock and control limit switches as heretofore, and the switches used as a part of the instant mechanism can be placed toward the outside of the table where they are readily accessible for servicing or replacement.

What is claimed is:

1. In a machine tool, an indexable table having a plurality of index stops spaced in accordance with the indexing movement of said table, a reversible drive for advancing and retracting said table, a reciprocable locating pin positioned to be contacted successively by said index stops during advancement of said table, cam means cooperating between said index stops and said locating pin for slidably actuating the latter as each stop advances against said pin whereby each stop overrides the pin and actuates the latter as a result thereof, said drive including switch means actuable to one switch position by said locating pin upon overriding movement thereof by one of said index stops to retract said table whereby to return the overriding stop into a butting engagement with said pin, and means rendered operative by retractive butting engagement of each index stop with said pin to move said switch to another switch position.

2. In a machine tool, an indexable table having a plurality of index stops spaced in accordance with the indexing movement of said table, a reversible drive for advancing and retracting said table, said drive including switch means operative in a first switch position to advance said table and movable to a second switch position for retracting said table and to a third switch position for initiating a subsequent operation of said machine tool, a reciprocable locating pin positioned to be contacted successively by said index stops during advancement of said table and operable by each such contact to actuate said switch means to said second switch position whereby to retract said table, each index stop adapted to override said pin when advanced thereagainst by said table and to move back against said pin when the direction of travel of said table is reversed by said switch means, and means rendered operative by backward engagement of each stop with said pin to actuate said switch means to said third switch position.

3. In a machine tool, an indexable table having a plurality of index stop spaced in accordance with the indexing movement of said table, a reversible drive for advancing and retracting said table, said drive including switch means operable in a first switch position to advance said table and movable to a second switch position for retracting said table and to a third switch position for initiating a subsequent operation of said machine tool, a reciprocable locating pin positioned to be contacted successively by said index stops during advancement of said table and operable by each such contact to actuate said switch means to said second switch position whereby to retract said table, each index stop adapted to override said pin when advanced thereagainst by said table and to move back against said pin when the direction of travel of said table is reversed by said switch means, and means rendered operative by backward engagement of each stop with said pin to actuate said switch means to a said third switch position, said reversible drive means also including a worm and gear set operable automatically by retractive butting engagement of an index stop with said pin to lock the table with the engaged stop against said pin.

4. In a machine tool, an indexable table having a plurality of index stops spaced in accordance with the indexing movement of said table, a reversible drive for advancing and retracting said table, said drive including switch means and operable in a first position of said switch means to advance said table and in a second position of said switch means for retracting said table and said switch means being operable to a third switch position to prepare said machine tool for a subsequent operation, a reciprocable locating pin positioned to be contacted successively by said index stops during advancement of said table and operable by each such contact to actuate said switch means to said second switch position whereby to cause said drive to retract said table, said locating pin provided with an air passage having an orifice, each index stop adapted to override said pin when advanced thereagainst by said table and to move back against said pin to close said orifice when the direction of travel of said table is reversed by operation of said switch means, and a pneumatically operated device in communication with the air passage of said pin operable by closure of said orifice to actuate said switch means to said third switch position.

5. In a machine tool, an indexable table having a plurality of index stops spaced in accordance with the indexing movement of said table, a reversible drive for advancing and retracting said table, said drive including switch means and operable in a first position of said switch means to advance said table and in a second position of said switch means for retracting said table, said switch means being operable to a third switch position for initiating a subsequent operation of said machine tool, a reciprocable locating pin positioned to be contacted successively by said index stops during advancement of said table and operable by each such contact to actuate said switch means to said second switch position whereby to cause said drive to retract said table, said locating pin provided with a passage having a forwardly facing orifice, each index stop adapted to override said pin when advanced thereagainst by said table and to move back against said pin to close said orifice when the direction of travel of said table is reversed by said drive means, means for supplying fluid under pressure to said passage whereby a relatively low fluid pressure exists in said passage when said orifice is open and a relatively high fluid pressure exists in said passage when said orifice is closed by one of said index stops, and pressure sensitive means communicating with said air passage and operatively associated with said switch means operable in response to a relatively high pressure condition in said passage to move said switch means to said third switch position.

6. In a machine tool, indexable table means; stationary means adjacent to said table means; a plurality of index stops on one of said means spaced in accordance with the indexing movement of said table means; a detent on the other of said means positioned for engagement by said stops; an electrically operable reversible drive for advancing said table means to bring said index stops successively against said detent so that each index stop in turn strikes, actuates and overrides said detent; and means responsive to overriding actuation of said detent by said index stops to reverse said drive and the direction of movement of the table means to back the actuating stop against said detent, said means including an electrical circuit for said drive, said circuit including switch means having control means associated and movable with said detent, said control means being engageable by said index stops and being operable by back-up engagement of the actuating stop with said detent to actuate said switch means.

7. In a machine tool, indexable table means; stationary means adjacent to said table means; a plurality of index stops on one of said means spaced in accordance with the indexing movement of said table means; a detent on the other of said means positioned for engagement by said index stops; an electrically operable reversible drive for advancing said table means to bring said index stops successively against said detent so that each index stop in turn strikes, actuates and overrides said detent; and means responsive to overriding actuation of said detent by said index stops to reverse said drive and the direction of movement of said table means to back the actuating stop against said detent, said means including an electrical circuit for said drive, said circuit including a switch and switch actuating means, said switch actuating means having control means associated with and movable with said detent, said control means being engageable by said index stops and being operable by back-up engagement of the actuating stop with said detent to operate said switch actuating means and said switch.

8. The combination as set forth in claim 7 wherein said switch actuating means is an air cylinder and wherein said control means is an air passage extending from said air cylinder to the face of said detent engaged by said index stops.

9. In a machine tool, an indexable table means; stationary means adjacent to said table means; a plurality of index stops on one said means spaced in accordance with the indexing movement of said table means; a detent on the other of said means positioned for engagement by said index stops; an electrically operable reversible drive for advancing said table means to bring said index stops successively against said detent so that each index stop in turn strikes, actuates and overrides said detent; and means responsive to overriding actuation of said detent by said index stops to reverse said drive and the direction of movement of said table means to back the actuating stop against said detent, said means including an electrical circuit for said drive, said circuit including a switch remote from said detent and switch actuating means operatively associated with said switch, said switch actuating means including control means carried by and movable with said detent and said control means being engageable with and operable by backup engagement of said actuating stop with said detent to operate said switch operating means and said switch.

References Cited in the file of this patent

UNITED STATES PATENTS

| | | |
|---|---|---|
| 2,011,486 | Kingsbury | Aug. 13, 1935 |
| 2,011,487 | Kingsbury | Aug. 13, 1935 |
| 2,164,396 | Foster et al. | July 4, 1939 |
| 2,255,199 | Van Hamersueld | Sept. 9, 1941 |
| 2,329,756 | Granberg et al. | Sept. 21, 1943 |
| 2,389,668 | Johnson | Nov. 27, 1945 |
| 2,464,996 | Schafer | Mar. 22, 1949 |
| 2,779,220 | Dunn et al. | Jan. 29, 1957 |
| 2,801,553 | Reynolds | Aug. 6, 1957 |

FOREIGN PATENTS

| | | |
|---|---|---|
| 588,179 | Great Britain | May 15, 1947 |